United States Patent
Hung et al.

(10) Patent No.: US 11,036,337 B2
(45) Date of Patent: Jun. 15, 2021

(54) METHOD OF SWITCHING OPERATION MODE OF TOUCH PANEL

(71) Applicants: Yen-Teng Hung, Taipei (TW); Pu-Wei Wang, Taipei (TW); Chun-Ta Chen, Taipei (TW)

(72) Inventors: Yen-Teng Hung, Taipei (TW); Pu-Wei Wang, Taipei (TW); Chun-Ta Chen, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 15 days.

(21) Appl. No.: 16/662,051

(22) Filed: Oct. 24, 2019

(65) Prior Publication Data

US 2020/0371661 A1 Nov. 26, 2020

Related U.S. Application Data

(60) Provisional application No. 62/851,097, filed on May 21, 2019.

(51) Int. Cl.
*G06F 3/041* (2006.01)
*G06F 3/044* (2006.01)

(52) U.S. Cl.
CPC ........ *G06F 3/04186* (2019.05); *G06F 3/0446* (2019.05)

(58) Field of Classification Search
None
See application file for complete search history.

(56) References Cited

U.S. PATENT DOCUMENTS

| | | | |
|---|---|---|---|
| 8,717,331 B2 | 5/2014 | Kremin et al. | |
| 8,773,146 B1 * | 7/2014 | Hills | G06F 3/041 |
| | | | 324/658 |
| 8,976,153 B2 | 3/2015 | Toda et al. | |
| 9,916,037 B2 | 3/2018 | Wu et al. | |
| 9,939,957 B2 | 4/2018 | Chiang | |

(Continued)

FOREIGN PATENT DOCUMENTS

| | | |
|---|---|---|
| CN | 107301006 | 10/2017 |
| CN | 109614016 | 4/2019 |

(Continued)

OTHER PUBLICATIONS

"Office Action of Taiwan Counterpart Application", dated Jul. 28, 2020, p. 1-p. 7.

*Primary Examiner* — Amare Mengistu
*Assistant Examiner* — Sarvesh J Nadkarni
(74) *Attorney, Agent, or Firm* — JCIPRNET

(57) ABSTRACT

The disclosure provides a method of switching an operation mode of a touch panel. The method includes: determining whether water is present on the touch panel; in response to determining that water is present on the touch panel, increasing a touch detection threshold and a sensing area threshold of the touch panel to switch the touch panel to a waterproof mode; in the waterproof mode, in response to determining that a touch event occurs on the touch panel, obtaining a sensing variation and a touch event area corresponding to the touch event; and in response to determining that the touch event area is larger than the sensing area threshold and the sensing variation is larger than the touch detection threshold, determining that the touch event is a touch operation.

13 Claims, 15 Drawing Sheets

(56) References Cited

U.S. PATENT DOCUMENTS

| | | | |
|---|---|---|---|
| 10,152,173 B2 | 12/2018 | Qu et al. | |
| 10,824,270 B1* | 11/2020 | Wang | G06F 3/044 |
| 2013/0207935 A1* | 8/2013 | Toda | G06F 3/044 |
| | | | 345/174 |
| 2015/0268796 A1* | 9/2015 | Tsuyuzaki | G06F 3/0445 |
| | | | 345/174 |
| 2015/0338983 A1* | 11/2015 | Benbasat | G06F 3/044 |
| | | | 345/174 |
| 2017/0003776 A1 | 1/2017 | Shepelev | |

FOREIGN PATENT DOCUMENTS

| | | |
|---|---|---|
| TW | 201640291 | 11/2016 |
| TW | I632495 | 8/2018 |

* cited by examiner

| 400a → | 0 | 1 | 2 | 0 | 2 | 4 | 0 | 0 | -1 |
|---|---|---|---|---|---|---|---|---|---|
| | -1 | 0 | 1 | -1 | -2 | 0 | 4 | 1 | 0 |
| | 3 | 1 | 1 | 0 | 0 | 0 | -2 | -3 | 1 |
| | -1 | 1 | -3 | 1 | 0 | -1 | -2 | -1 | -1 |
| | 0 | 1 | 2 | 1 | 0 | 3 | 1 | 1 | -1 |
| | 1 | 1 | 2 | 0 | 1 | 0 | 1 | 0 | 0 |
| | 3 | 1 | -1 | -2 | -3 | -1 | -1 | 0 | 2 |
| | -1 | -2 | 2 | 1 | 3 | 2 | 4 | 3 | 4 |
| | 2 | 4 | 1 | 2 | -1 | -2 | -1 | 0 | -3 |

|   |   |   |   | 410 ↓ |   |   |   |   |
|---|---|---|---|---|---|---|---|---|
| 2 | 4 | 26 | 69 | 139 | −74 | 26 | 5 | −3 |
| 0 | 83 | 340 | 107 | −259 | −72 | 9 | −14 | −1 |
| −1 | 152 | 316 | 148 | −370 | −226 | 151 | 15 | 0 |
| 3 | 63 | 52 | −102 | −228 | −55 | 371 | 124 | 1 |
| −1 | −48 | 37 | 165 | 98 | 84 | −85 | −15 | −1 |
| 0 | −71 | −206 | 273 | 603 | −293 | −235 | −36 | −1 |
| 1 | −47 | −191 | −76 | 544 | 11 | −132 | −25 | 0 |
| 3 | −35 | −119 | −181 | 42 | 455 | 21 | −10 | 2 |
| −1 | −24 | −50 | −80 | −227 | 243 | 37 | −7 | 4 |

FIG. 4B

METHOD OF SWITCHING OPERATION MODE OF TOUCH PANEL

CROSS-REFERENCE TO RELATED APPLICATION

This application claims the priority benefit of U.S. provisional application Ser. No. 62/851,097, filed on May 21, 2019. The entirety of the above-mentioned patent application is hereby incorporated by reference herein and made a part of this specification.

BACKGROUND

1. Technical Field

The disclosure relates to a control mechanism of a touch panel and more particularly relates to a method of switching an operation mode of a touch panel.

2. Description of Related Art

Touch panel has become one of the most common input devices for electronic apparatuses. However, when there is a certain amount of water on a touch panel, it may cause the touch panel to generate an error when reporting the touch coordinates. In order to avoid such a situation, the conventional mechanism is to control the touch panel to stop reporting the touch coordinates when detecting water on the touch panel. This mechanism, however, makes it impossible for the user to operate the touch panel when there is water on the touch panel (rainy days, for example) and causes inconvenience in use.

SUMMARY

In view of the above, the disclosure provides a method of switching an operation mode of a touch panel.

The disclosure provides a method of switching an operation mode of a touch panel, including: determining whether water is present on the touch panel; in response to determining that water is present on the touch panel, increasing a touch detection threshold of the touch panel and increasing a sensing area threshold of the touch panel to switch the touch panel to a waterproof mode; in the waterproof mode, in response to that a first touch event occurs on the touch panel, obtaining a first sensing variation and a first touch event area corresponding to the first touch event; and in response to determining that the first touch event area is larger than the sensing area threshold and the first sensing variation is larger than the touch detection threshold, determining that the first touch event is a first touch operation.

Based on the above, the method of the disclosure makes it possible to switch the touch panel to the waterproof mode after determining that water is present on the touch panel, so that the touch panel can maintain the function of correctly reporting the touch coordinate.

In order to make the aforementioned and other features and advantages of the disclosure more comprehensible, embodiments accompanied with drawings are described in detail below.

BRIEF DESCRIPTION OF THE DRAWINGS

FIG. 4A is a schematic diagram when no water is present on a touch panel according to an embodiment of the disclosure.

FIG. 4B is a schematic diagram when water is present on the touch panel according to FIG. 4A.

DESCRIPTION OF THE EMBODIMENTS

Figure 1:
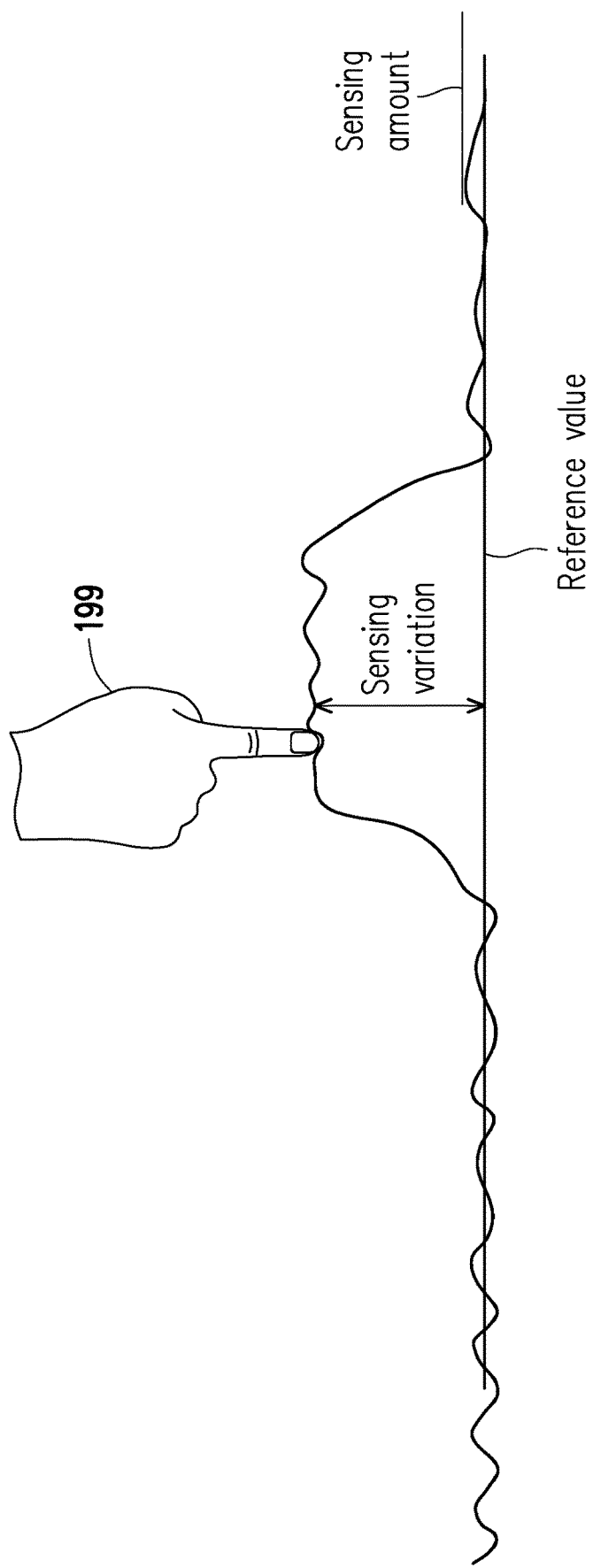
FIG. 1 is a schematic diagram of a touch detection mechanism according to an embodiment of the disclosure.

Please refer to FIG. 1, which is a schematic diagram of a touch detection mechanism according to an embodiment of the disclosure. In general, a touch panel is provided with a plurality of sensors that are arranged in rows and columns (for example, capacitive touch sensors or the like), and the illustration of FIG. 1 may correspond to the detection performed by the sensors in one of the rows or columns, but not limited thereto. It should be noted that the touch panel referred to in the disclosure may be a touch screen or other similar touch devices.

Referring to FIG. 1, when an electronic apparatus provided with the touch panel is turned on or activated, the touch panel detects a sensing amount (for example, capacitance) of each sensor in the initialization stage to serve as the reference value. The sensing amount represents a state where there is no finger, stylus or the like on the touch panel.

After the initialization stage is completed, each sensor may perform detection to obtain its own sensing amount. When the difference between the sensing amount and the reference value (hereinafter referred to as sensing variation) of a sensor exceeds a touch detection threshold, the touch panel may correspondingly report a touch coordinate.

Take FIG. 1 as an example, when no object is present on the touch panel, the sensing amount of each sensor (generally between ±30) may come from sources such as noise. However, when a finger 199 or a similar object touches the touch panel, it may cause the sensing variation of one or more sensors at the touched position to be larger than the set touch detection threshold. In such a case, the touch panel reports the corresponding touch coordinate in response to the touch of the finger 199.

However, when water is present on the touch panel (for example, water droplet, water flow or the like), the sensor that is in contact with the water also detects a certain sensing variation. In order to prevent the touch panel from generating an erroneous operation in such a situation (for example, in response to a finger touch, a wrong touch coordinate may be reported), generally the touch panel may stop reporting the touch coordinate when determining that the touch area of the touch operation is too large (for example, larger than a sensing area threshold). In some embodiments, the touch area may be estimated based on the number of the sensors that are in contact with water.

Figure 2B:
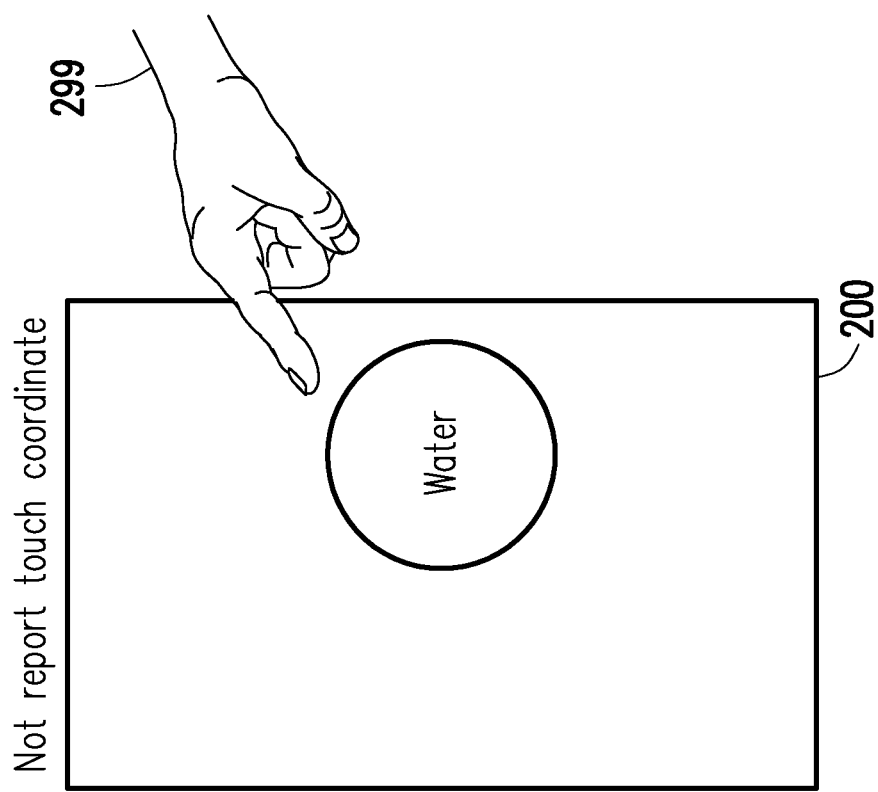
FIG. 2B is a schematic diagram of not reporting a touch coordinate according to an embodiment of the disclosure.
Figure 2A:
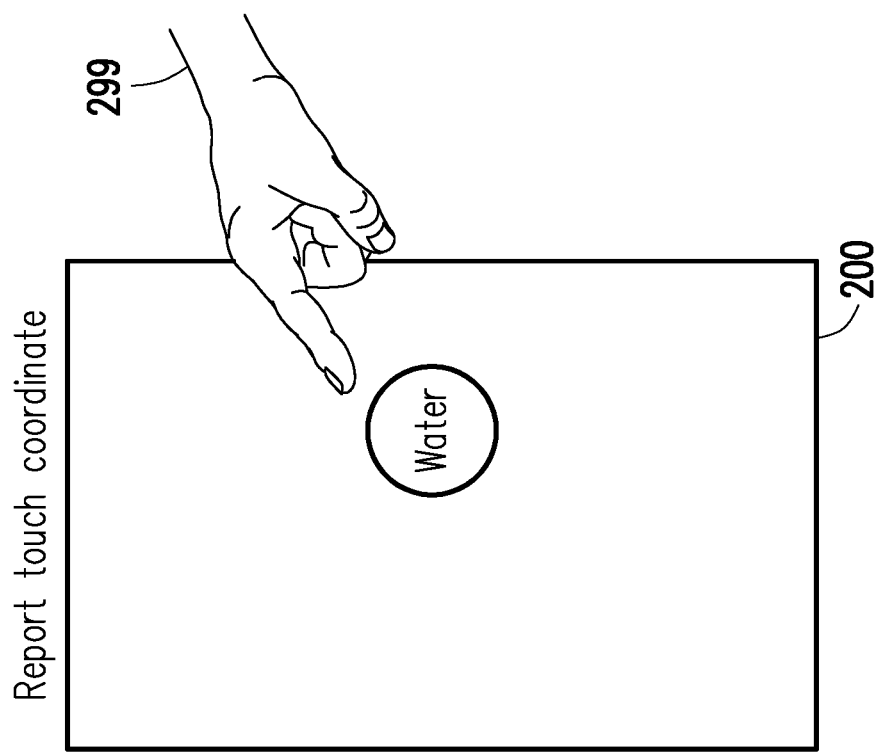
FIG. 2A is a schematic diagram of reporting a touch coordinate according to an embodiment of the disclosure.

Please refer to FIG. 2A and FIG. 2B. FIG. 2A is a schematic diagram of reporting a touch coordinate according to an embodiment of the disclosure, and FIG. 2B is a schematic diagram of not reporting a touch coordinate according to an embodiment of the disclosure. In FIG. 2A, assuming that the water on the touch panel 200 has a relatively small area, the touch panel 200 may maintain the mechanism of reporting a touch coordinate so as to report the touch coordinate correspondingly when a hand 299 touches the touch panel 200.

On the other hand, in FIG. 2B, assuming that the water on the touch panel 200 has an overly large area (for example, larger than a sensing area threshold), the touch panel 200 may stop the mechanism of reporting a touch coordinate so as to prevent an erroneous operation when the hand 299 touches the touch panel 200. However, such a mechanism may have adverse effects when the user operates the touch panel on rainy days or in other similar situations.

In view of the above, the disclosure provides a method of switching an operation mode of a touch panel, which adjusts a method of detecting touch after determining that water is present on the touch panel, allowing the touch panel to maintain the mechanism of reporting the touch coordinate without an erroneous operation. The details are provided hereinafter.

Figure 3:
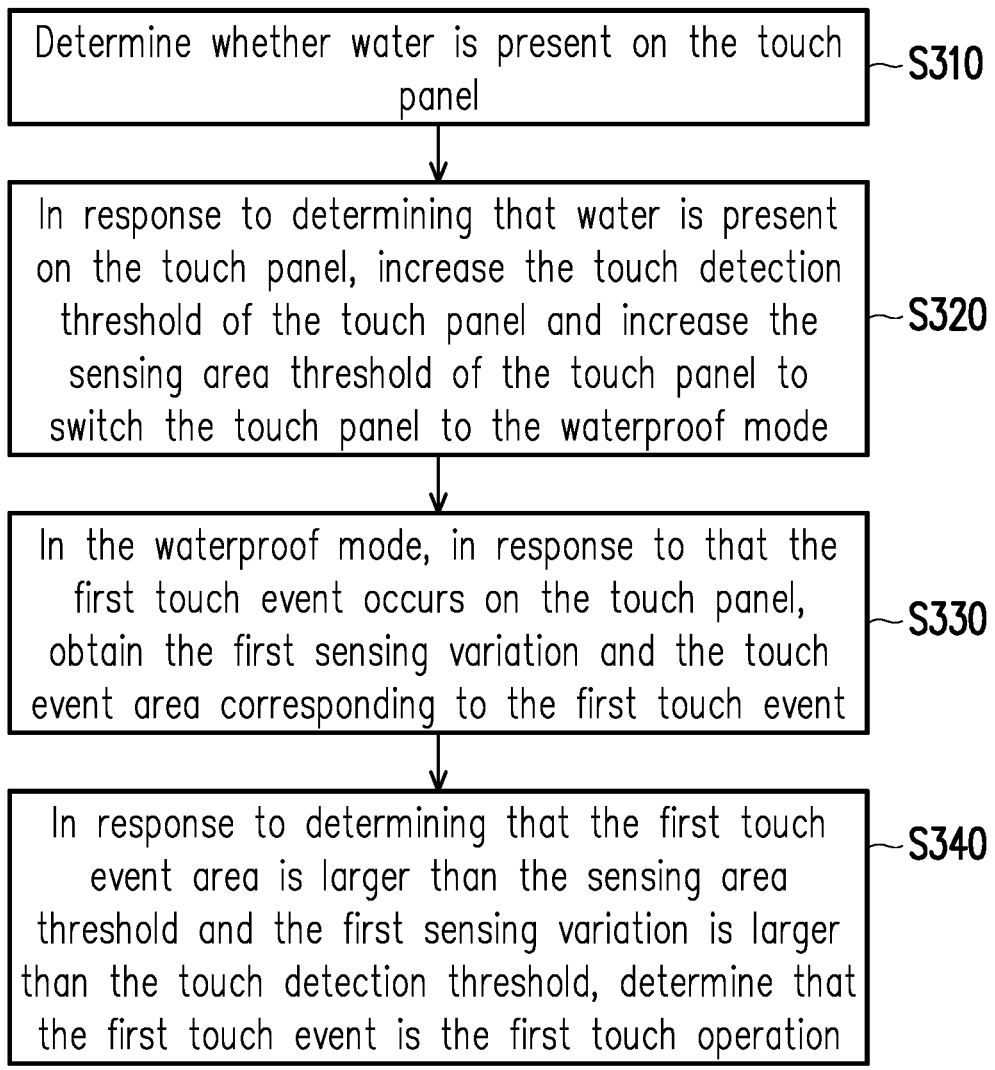
FIG. 3 shows a method of switching an operation mode of a touch panel according to an embodiment of the disclosure.

Please refer to FIG. 3, which shows a method of switching an operation mode of a touch panel according to an embodiment of the disclosure. The method of FIG. 3 may be performed by a touch panel or other related touch panel control circuits. For convenience, it is assumed hereinafter that the method of FIG. 3 is performed by a control circuit of a touch panel. Nevertheless, the following is not intended to limit possible embodiments of the disclosure. In other embodiments, the control circuit may be, for example, a processor (for example, a central processor, a microprocessor or the like, but not limited thereto) in an electronic apparatus provided with a touch panel. In some embodiments, the control circuit may perform the method of the disclosure by executing a specific module, code or software, but not limited thereto.

First, in Step S310, the control circuit determines whether water is present on the touch panel. In brief, the edge of the water causes the sensor at the corresponding position to detect a certain negative sensing amount. In the embodiment of the disclosure, this principle is applied to detect whether water is present on the touch panel.

In an embodiment, the control circuit determines whether a specific column or a specific row is present on the touch panel, wherein the sensors in the specific column or the specific row are at least divided into a first group, a second group, and a third group, wherein the second group is between the first group and the third group. Moreover, a sensing variation of each of the sensors in the first group and the third group is smaller than a negative sensing threshold (for example, −200), and a sensing variation of each of the sensors in the second group is larger than a positive sensing threshold (for example, +200). In response to determining that the specific column or the specific row is present, the control circuit determines that water is present on the touch panel.

However, if no specific column or specific row is present on the touch panel, the control circuit correspondingly determines that no water is present on the touch panel. To make the above more comprehensible, embodiments of the disclosure will be described in further detail hereinafter with reference to FIG. 4A and FIG. 4B.

Please refer to FIG. 4A, which is a schematic diagram when no water is present on the touch panel according to an embodiment of the disclosure. Referring to FIG. 4A, a touch panel 400 includes a plurality of sensors 400a that are arranged in a plurality of rows and columns, and a sensing amount of each of the sensors 400a is represented by the number in the sensor 400a. For convenience, "0" in FIG. 4A may be understood as the reference value mentioned above. In such a case, the sensing amount of each of the sensors 400a may be interpreted as the sensing variation thereof accordingly. That is, if a sensor 400a is marked as "0", it means that the current sensing amount is the same as the reference value. If a sensor 400a is marked as "k", it means that the current sensing amount is larger than the reference value by k (k is any positive number). If a sensor 400a is marked as "−k", it means that the current sensing amount is smaller than the reference value by k. Nevertheless, the disclosure is not limited thereto.

In the present embodiment, when no water or object is present on the touch panel 400, the sensing amount of each of the sensors 400a is as shown in FIG. 4A. As can be seen from FIG. 4A, the sensing variation of each of the sensors 400a falls between a negative sensing threshold (for example, −10) and a positive sensing threshold (for example, +10). Therefore, after scanning the touch panel 400 column by column/row by row, the control circuit determines that the specific column or the specific row is not present on the touch panel 400 and thereby determines that no water is present on the touch panel 400.

Then, please refer to FIG. 4B, which is a schematic diagram when water is present on the touch panel according to FIG. 4A. As shown in FIG. 4B, when water (for example, water droplet) is present on the touch panel 400, the sensing variations of some of the sensors 400a are smaller than the negative sensing threshold (for example, −200) or larger than the positive sensing threshold (for example, +200).

As can be seen from FIG. 4B, the first group G1, the second group G2, and the third group G3 are in the column 410. In the first group G1 and the third group G3, the sensing variation of each of the sensors 400a is smaller than the negative sensing threshold (for example, −200). In addition, in the second group G2 (which is between the first group G1 and the third group G3), the sensing variation of each of the sensors 400a is larger than the positive sensing threshold (for example, +200). Therefore, after scanning to the column 410 to obtain the sensing variation of each of the sensors 400a, the control circuit determines that the column 410 is the specific column described above, and correspondingly determines that water is present on the touch panel 400.

In other embodiments, if only the first group G1 and the second group G2 are in the column 410, the control circuit may also determine that a specific column is present in the touch panel 400 and thereby determine that water is present on the touch panel 400. Nevertheless, the disclosure is not limited thereto.

In addition, as can be seen from FIG. 4B, the first group G1', the second group G2', and the third group G3' are in the row 420. In the first group G1' and the third group G3', the sensing variation of each of the sensors 400a is smaller than the negative sensing threshold (for example, −200). In addition, in the second group G2' (which is between the first group G1' and the third group G3'), the sensing variation of each of the sensors 400a is larger than the positive sensing threshold (for example, +200). Therefore, after scanning to the row 420 to obtain the sensing variation of each of the sensors 400a, the control circuit determines that the row 420 is the specific row, and correspondingly determines that water is present on the touch panel 400.

In other embodiments, if only the first group G1' and the second group G2' are in the row 420, the control circuit may also determine that a specific row is present in the touch panel 400 and thereby determine that water is present on the touch panel 400. Nevertheless, the disclosure is not limited thereto.

Referring to FIG. 3 again, in Step S320, in response to determining that water is present on the touch panel, the control circuit increases a touch detection threshold of the touch panel and increases a sensing area threshold of the touch panel to switch the touch panel to a waterproof mode. Next, in Step S330, in the waterproof mode, in response to that a first touch event occurs on the touch panel, the control circuit obtains a first sensing variation and a first touch event area corresponding to the first touch event. Then, in Step S340, in response to determining that the first touch event area is larger than the sensing area threshold and the first sensing variation is larger than the touch detection threshold, the control circuit determines that the first touch event is a first touch operation.

In an embodiment, after determining that the first touch event is the first touch operation, the control circuit reports a touch coordinate correspondingly for the electronic apparatus to perform a corresponding function in response to the first touch operation. However, if the control circuit determines that the first touch event area is not larger than the sensing area threshold or the first sensing variation is not larger than the touch detection threshold, the control circuit ignores the first touch event. That is, the electronic apparatus does not perform any function in response to the first touch event.

In an embodiment, when the touch panel is switched to the waterproof mode, the control circuit increases the touch detection threshold from a preset detection threshold (for example, 100) to a first detection threshold (for example, 250) and increases the sensing area threshold from a preset area threshold (for example, a sensing area formed with a finger width of 7 mm) to a first area threshold (for example, a sensing area formed with a finger width of 9 mm), wherein the preset detection threshold and the preset area threshold correspond to the general detection mode of the touch panel. That is, the touch panel determines the general detection mode according to the preset detection threshold and the preset area threshold.

Specifically, in the general detection mode, if a touch event is detected on the touch panel, the control circuit obtains the sensing variation and the touch event area of the touch event. In an embodiment, the control circuit obtains a plurality of specific sensors corresponding to the touch event and selects one sensor from the specific sensors, and takes the sensing variation of the sensor (for example, the highest one) as the sensing variation of the touch event. In addition, the touch event area of the touch event may be determined by the number of specific sensors covered by the touch event. For example, the control circuit may take the total area occupied by the specific sensors as the touch event area of the touch event.

After obtaining the sensing variation and the touch area of the touch event, the control circuit determines whether the sensing variation is larger than the preset detection threshold and determines whether the touch event area is larger than the preset area threshold. If the sensing variation is larger than the preset detection threshold and the touch event area is larger than the preset area threshold, the control circuit determines that the touch event is a touch operation performed by the user and reports the touch coordinate correspondingly.

However, in the case where water is present on the touch panel, if the touch detection threshold is not increased, the control circuit may generate an erroneous operation in response to the sensing variation caused by water. Since water is a conductor, when an object such as a finger touches the touch panel through water, a larger touch area is formed on the touch panel. Therefore, increasing the touch detection threshold and the sensing area threshold of the touch panel (that is, switching the touch panel to the waterproof mode) helps detect a touch operation when water is present on the touch panel. To make the above clearer, embodiments of the disclosure will be described hereinafter with reference to FIG. 5A and FIG. 5B.

Figure 5A:
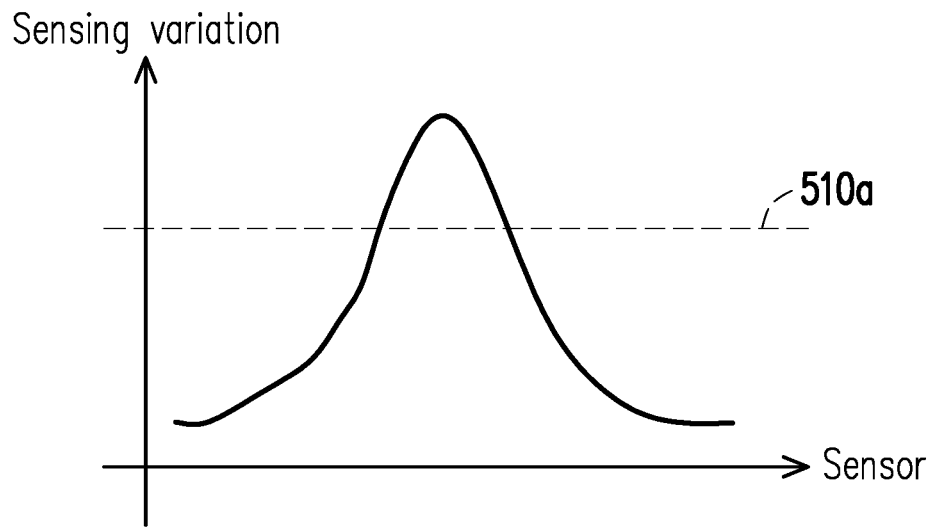
FIG. 5A is a schematic diagram of touch detection in a general detection mode according to an embodiment of the disclosure.

Please refer to FIG. 5A, which is a schematic diagram of touch detection in the general detection mode according to an embodiment of the disclosure. In FIG. 5A, the sensing variation trend chart in the upper half of FIG. 5A corresponds to, for example, the line a-a' in the lower half of FIG. 5A. As shown in FIG. 5A, in the general detection mode, the touch detection threshold adopted is, for example, the preset detection threshold 510a (for example, 100). In such a case, if the control circuit detects that a touch event 500a occurs on the touch panel 500, the control circuit determines that the sensing variation and the touch event area of the touch event 500a are larger than the preset detection threshold 510a (for example, 100) and the preset area threshold respectively and then determines that the touch event 500a is a touch operation, and reports the touch coordinate correspondingly.

Figure 5B:
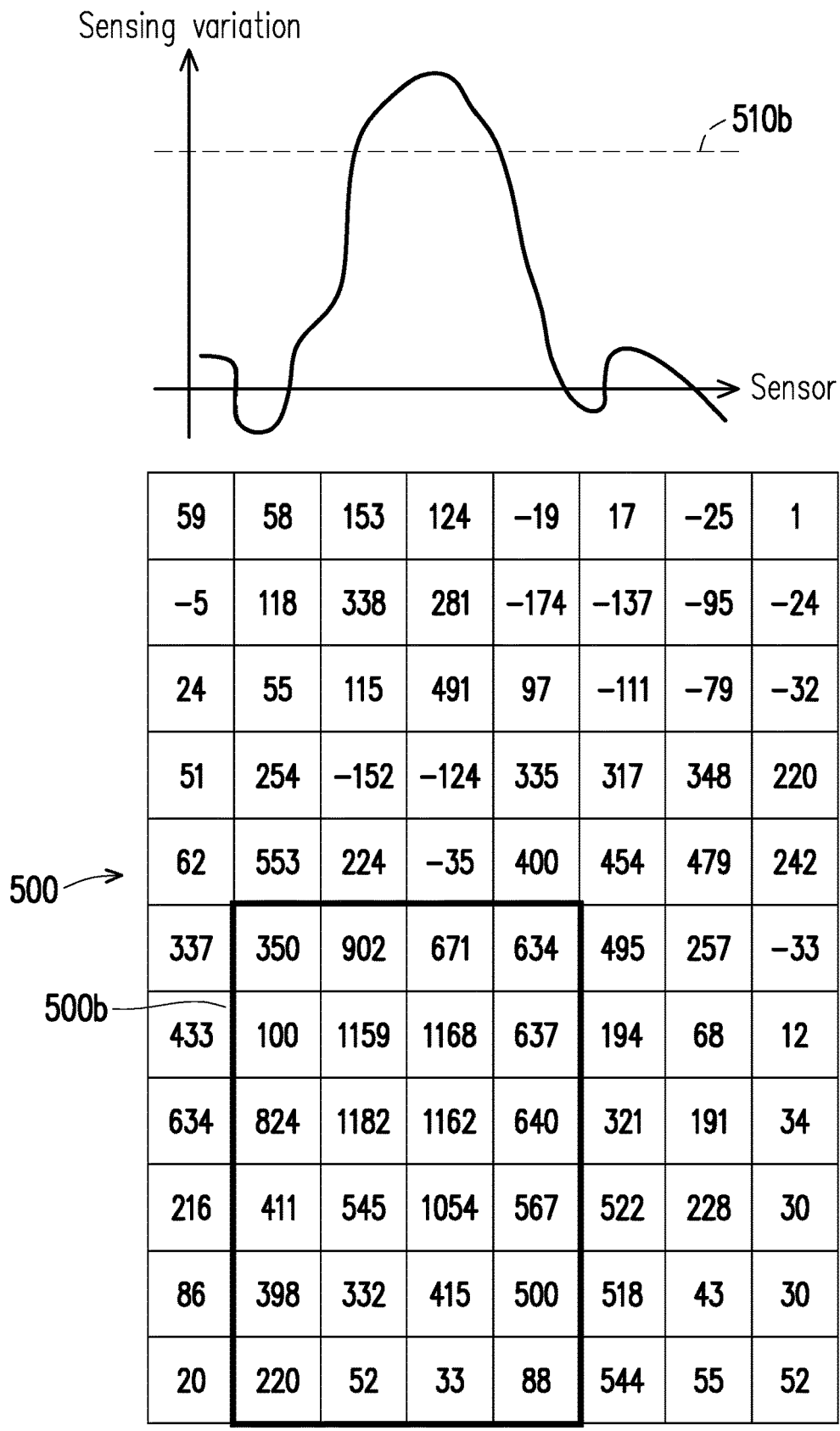
FIG. 5B is a schematic diagram of touch detection in a waterproof mode according to FIG. 5A.

Please refer to FIG. 5B, which is a schematic diagram of touch detection in the waterproof mode according to FIG. 5A. As shown in FIG. 5B, in the waterproof mode, the touch detection threshold adopted is, for example, the first detection threshold 510b (for example, 250). In such a case, if the control circuit detects that a touch event 500b occurs on the touch panel 500, the control circuit determines that the sensing variation (for example, 1182) and the touch event area of the touch event 500b are larger than the first detection threshold 510b (for example, 250) and the first area threshold respectively and then determines that the touch event 500b is a touch operation, and reports the touch coordinate correspondingly.

In some embodiments, after switching the touch panel from the general detection mode to the waterproof mode, the control circuit further determines whether a touch event is detected within a first preset time (for example, 1 second). If no touch event is detected within the first preset time, the control circuit restores the touch detection threshold to the preset detection threshold (for example, 100) and restores the sensing area threshold to the preset area threshold to switch the touch panel to the general detection mode. Nevertheless, the disclosure is not limited thereto.

In addition, although the water that is present on the touch panel in the above exemplary embodiments is a water droplet, the disclosure is not limited thereto. The method of the disclosure may also be applied to a situation where a water flow is present on the touch panel. Embodiments of the disclosure will be described hereinafter with reference to FIG. 6A, FIG. 6B, and FIG. 6C.

Figure 6A:
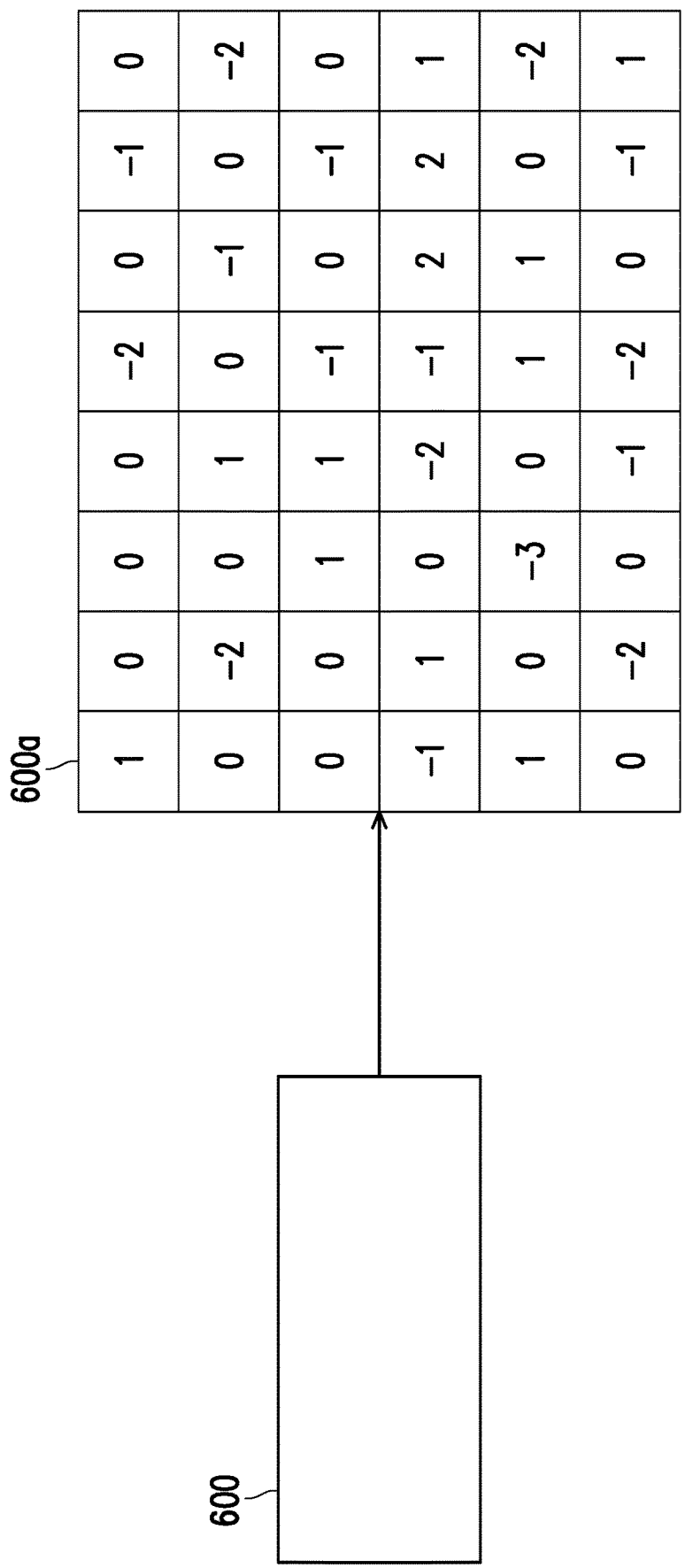
FIG. 6A is a schematic diagram of a situation when no water is present on a touch panel according to an embodiment of the disclosure.

Please refer to FIG. 6A, which is a schematic diagram of a situation when no water is present on the touch panel according to an embodiment of the disclosure. As shown in FIG. 6A, when no water is present on the touch panel 600, the sensing variation of each of the sensors 600a falls between the negative sensing threshold (for example, −10) and the positive sensing threshold (for example, +10).

Figure 6B:
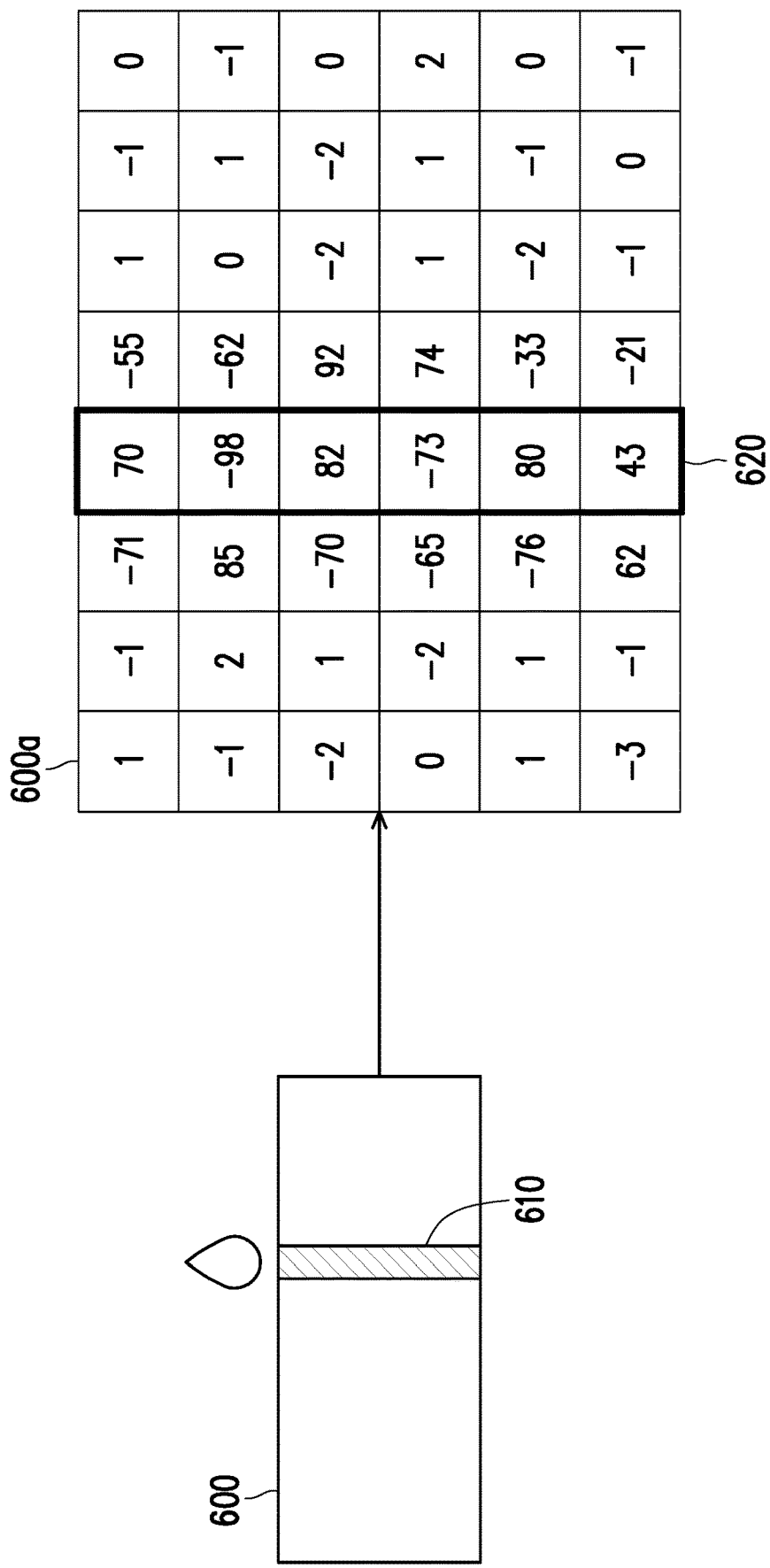
FIG. 6B is a schematic diagram of a situation when a water flow is present on the touch panel according to FIG. 6A.

Please refer to FIG. 6B, which is a schematic diagram of a situation when a water flow is present on the touch panel according to FIG. 6A. As shown in FIG. 6B, when a water flow 610 is present on the touch panel 600, the column 620 in the touch panel 600 includes the first group (which includes a sensor 600a having a sensing variation of −98), the second group (which includes a sensor 600a having a sensing variation of 82), and the third group (which includes a sensor 600a having a sensing variation of −73). Thus, after scanning the rows and columns of the touch panel 600, the control circuit determines that a specific column (that is, the column 620) is present in the touch panel 600 and thereby determines that water (that is, the water flow 610) is present on the touch panel 600. Correspondingly, the control circuit switches the touch panel to the waterproof mode, that is, increasing the touch detection threshold and the sensing area threshold.

Figure 6C:
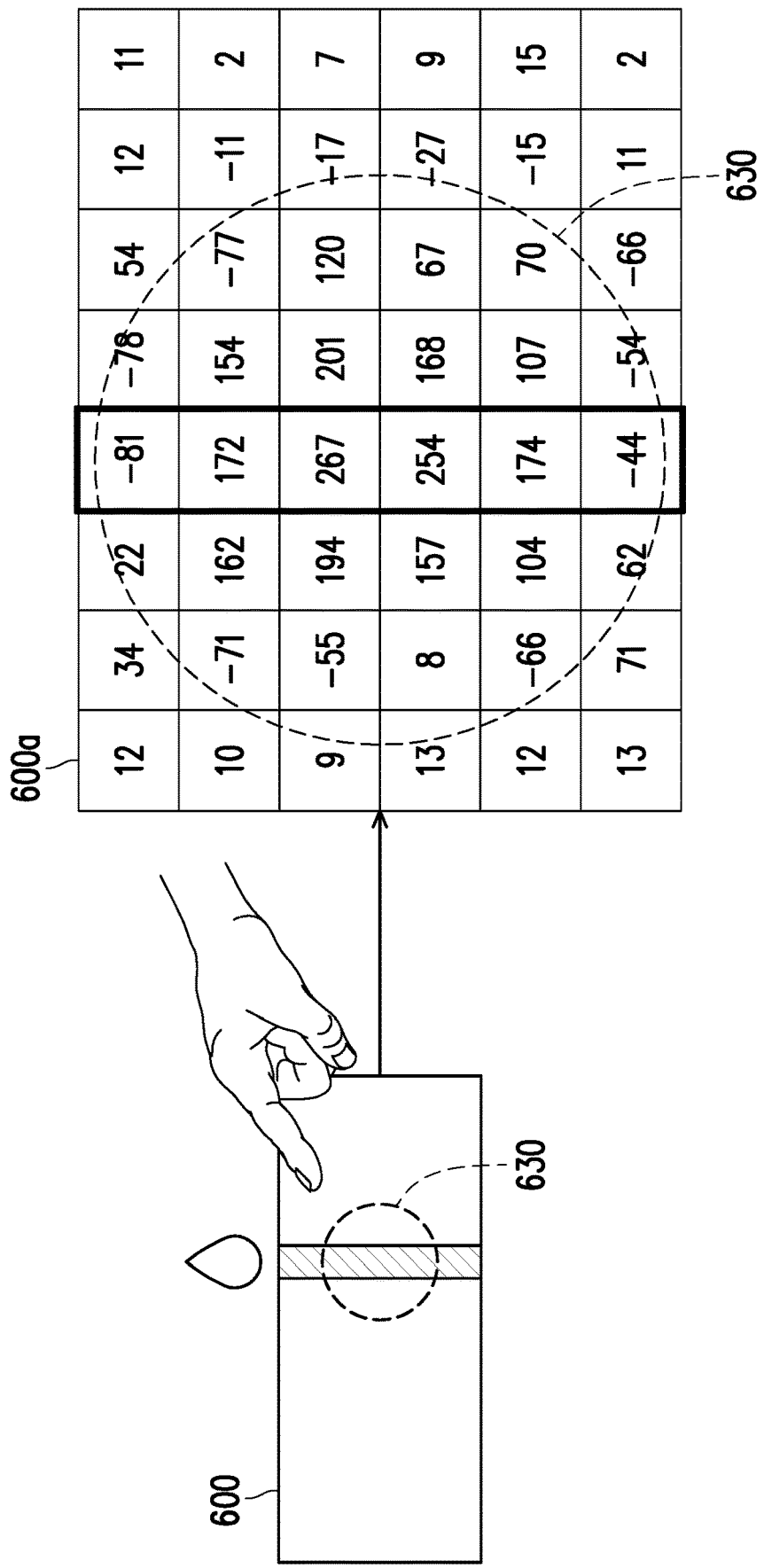
FIG. 6C is a schematic diagram of detecting a touch operation according to FIG. 6B.

Please refer to FIG. 6C, which is a schematic diagram of detecting a touch operation according to FIG. 6B. As shown in FIG. 6C, in the case where the touch panel 600 operates in the waterproof mode, if the sensing variation (for example, 162) and the touch event area of the touch event 630 are larger than the touch detection threshold and the sensing area threshold in the waterproof mode respectively, the control circuit correspondingly determines that the touch event 630 is a touch operation, and correspondingly reports the touch coordinate (for example, the coordinate of the sensor 600a having a sensing variation of 162, but not limited thereto).

It is known from the above that the method of the disclosure increases the touch detection threshold and the sensing area threshold correspondingly after determining that water is present on the touch panel, so that the touch panel can maintain the function of correctly reporting the touch coordinate. Therefore, the user can operate the touch panel even when water is present on the touch panel.

In some embodiments, in order to allow the user to operate the touch panel when wearing gloves, some electronic apparatuses are also provided with a glove mode to be activated with a finger in the user interface when needed. When the user touches the sensor on the touch panel through a glove, it only causes the sensor to generate a weak sensing variation. Therefore, after the user manually activates the glove mode of the electronic apparatus, the electronic apparatus decreases the touch detection threshold of the touch panel correspondingly so as to facilitate detection of the touch operation that the user performs with a glove.

However, as mentioned in the previous embodiments, when water is present on the touch panel, it causes the sensor to detect a certain sensing variation. That is, if water falls onto the touch panel that operates in the glove mode, the sensing variation caused by the water may exceed the touch detection threshold and cause the touch panel to report an erroneous touch coordinate.

In view of the above, after determining that no water is present on the touch panel, the method of the disclosure also allows the user wearing gloves to activate the glove mode by inputting a gesture, which meets certain conditions, on the touch panel. Thereby, the user can activate the glove mode easily, and reporting of an erroneous touch coordinate caused by water can also be prevented. The details are provided hereinafter.

Figure 7:
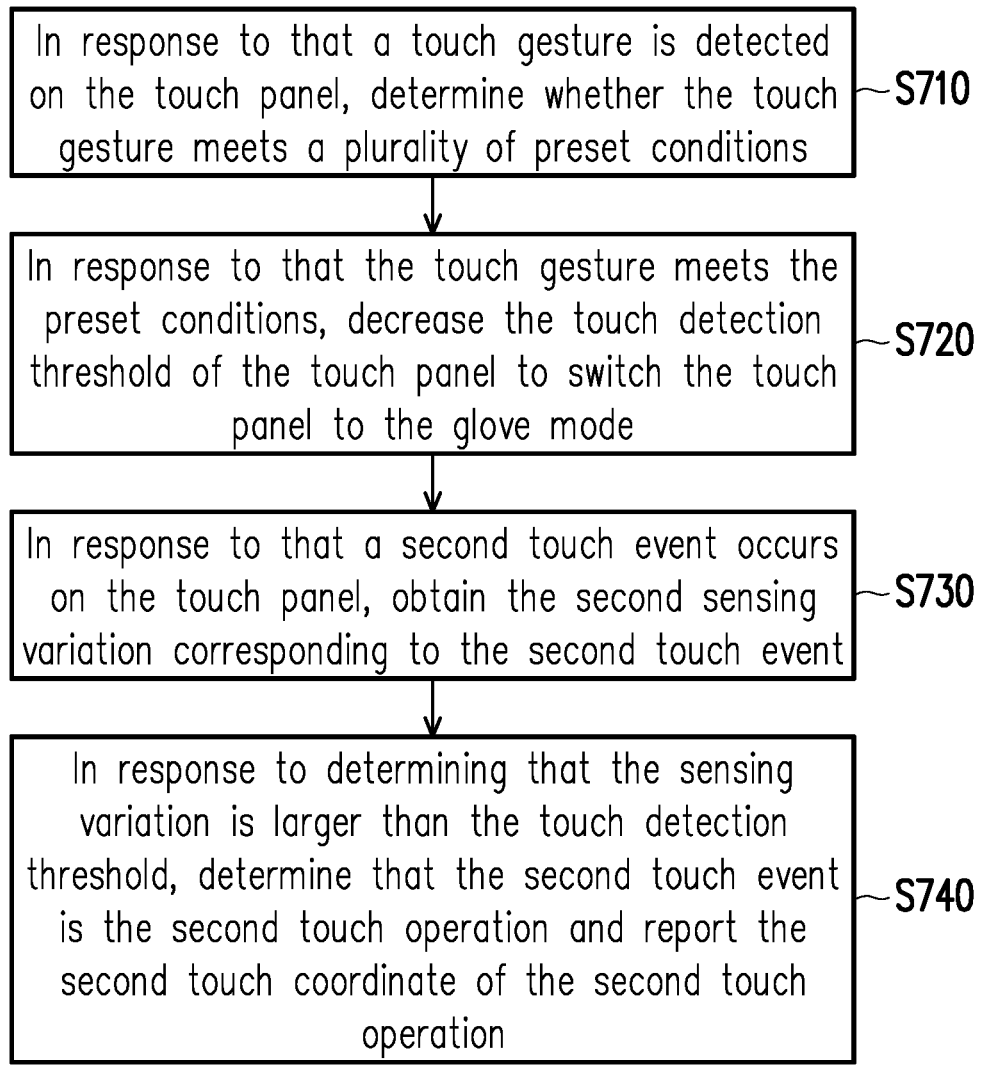
FIG. 7 is a flow chart of a method of switching an operation mode of a touch panel according to FIG. 3.

Please refer to FIG. 7, which is a flow chart of a method of switching an operation mode of a touch panel according to FIG. 3. Like FIG. 3, the method of FIG. 7 may also be performed by a touch panel or other related touch panel control circuits. For convenience, it is assumed hereinafter that the method of FIG. 7 is performed by a control circuit of a touch panel. Nevertheless, the following is not intended to limit possible embodiments of the disclosure.

In the present embodiment, after determining that no water is present on the touch panel, the control circuit determines whether a touch gesture is detected on the touch panel. Then, in Step S710, in response to that a touch gesture is detected on the touch panel, the control circuit determines whether the touch gesture meets a plurality of preset conditions.

In some embodiments, the preset conditions include a first preset condition, a second preset condition, and a third preset condition. In an embodiment, the control circuit obtains a plurality of touch points included in the touch gesture, wherein each of the touch points includes a touch range and a plurality of sensing variations, wherein the sensing variations of each of the touch points are provided by the sensors within the touch range.

Thereafter, the control circuit is configured to: determine whether the area of the touch range of each of the touch points is larger than a specific area threshold, and generate a first determination result corresponding to the first preset condition; determine whether the sensing variations of each of the touch points are all larger than a specific sensing variation threshold (for example, smaller than the touch detection threshold), and generate a second determination result corresponding to the second preset condition; and determine whether a movement distance of a movement trajectory of the touch gesture is larger than a preset distance and whether the movement trajectory matches a preset trajectory, and generate a third determination result corresponding to the third preset condition.

In response to that the first determination result indicates that the area of the touch range of each of the touch points is larger than the specific area threshold, the second determination result indicates that the sensing variations of each of the touch points are all smaller than the specific sensing variation threshold, and the third determination result indicates that the movement distance of the movement trajectory of the touch gesture is larger than the preset distance and matches the preset trajectory, the control circuit determines that the touch gesture meets the above preset conditions.

To be more specific, if the user touches the touch panel with a finger with the glove on, the glove not only causes the touched sensor to detect a smaller sensing variation but also increases the number of sensors that are touched to generate a larger touch range. Therefore, the disclosure sets the first preset condition (that is, whether the touch range of each of the touch points is large enough) and the second preset condition (that is, whether each sensing variation within the touch range of each of the touch points is small enough)

according to the above principle. If the touch gesture meets both the first preset condition and the second preset condition, the control circuit may roughly determine that the received touch gesture is inputted by a glove.

Figure 8A:
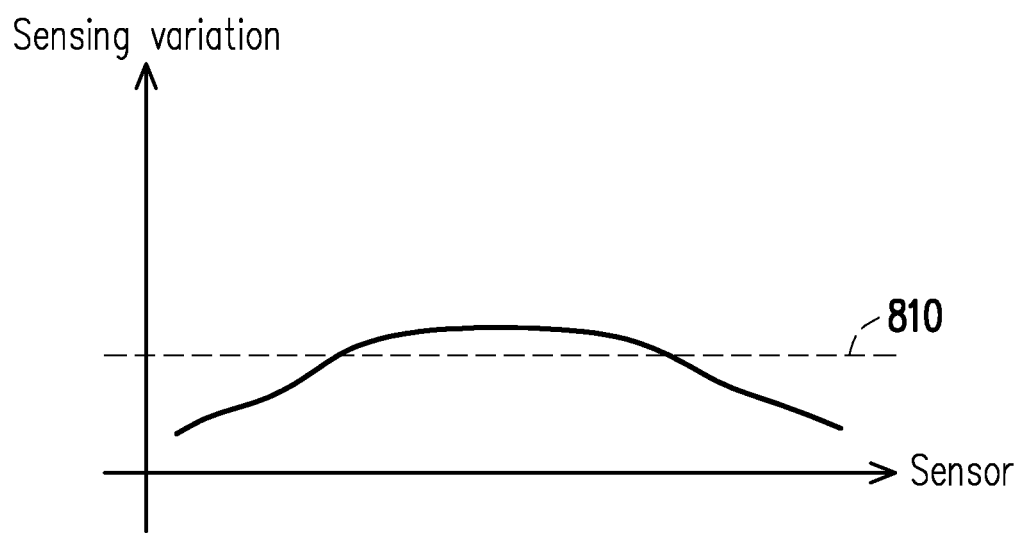
FIG. 8A is a schematic diagram of detecting whether a touch gesture is inputted by a glove according to an embodiment of the disclosure.

Please refer to FIG. 8A, which is a schematic diagram of detecting whether a touch gesture is inputted by a glove according to an embodiment of the disclosure. In the present embodiment, if the user touches the touch panel with a glove to form a touch point, the sensing variation trend chart as shown in FIG. 8A is correspondingly presented on the touch panel, that is, smaller sensing variations and larger touch range.

In such a case, since the touch range of the touch point is larger than the specific area threshold and the sensing variations are all larger than the specific sensing variation threshold 810, the control circuit correspondingly determines that the touch point is inputted by a glove.

Figure 8B:
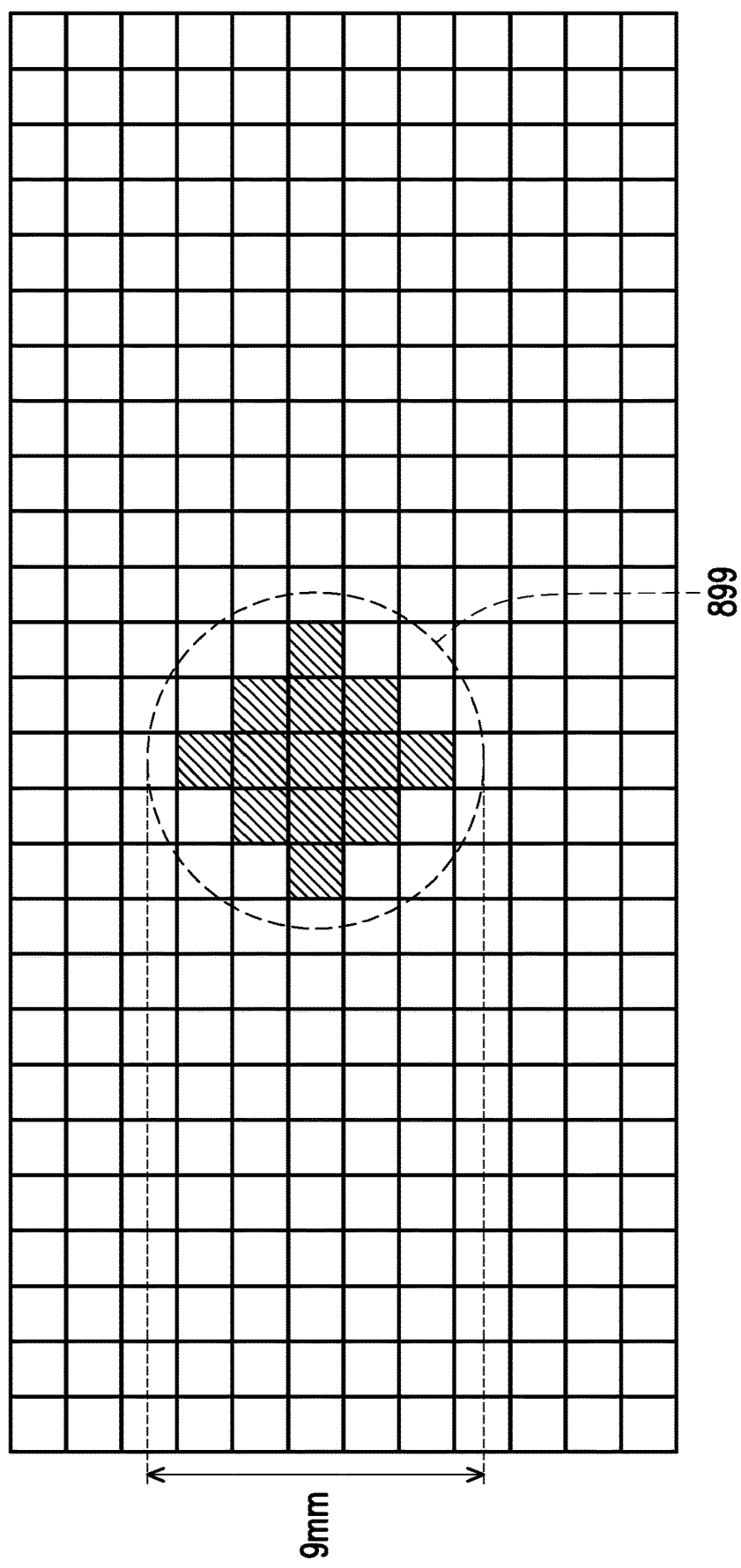
FIG. 8B is a schematic diagram of detecting whether a touch gesture is inputted by a glove according to another embodiment of the disclosure.

Then, please refer to FIG. 8B, which is a schematic diagram of detecting whether a touch gesture is inputted by a glove according to another embodiment of the disclosure. In the present embodiment, it is assumed that the user touches the touch panel 800 with a glove to form a touch point 899. As can be seen from FIG. 8B, the touch range of the touch point 899 is relatively large (since the glove has a finger width of 9 mm, for example).

In addition, if the movement distance of the movement trajectory of the touch gesture is larger than the preset distance (for example, the width of eight sensors) and the movement trajectory matches the preset trajectory (that is, the third preset condition is met), the control circuit determines that the user intends to activate the glove mode with the touch gesture inputted with the glove. In other embodiments, the preset trajectory may be selected by the user in a related user interface, for example.

Figure 9:
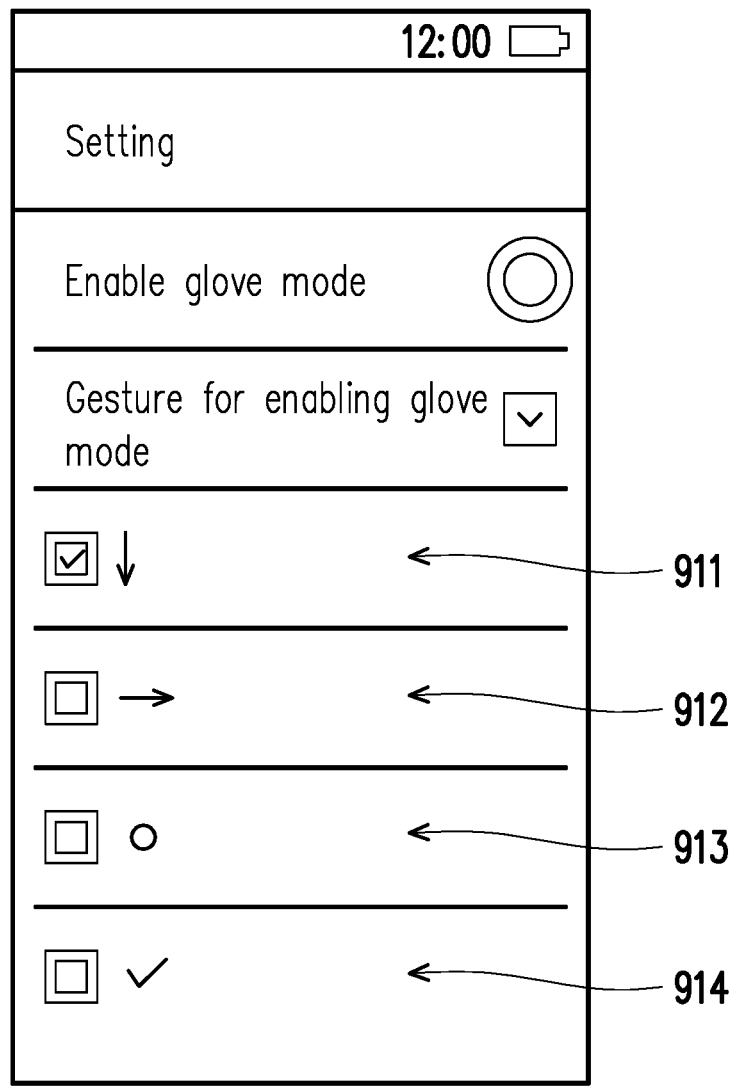
FIG. 9 is a schematic diagram of a user interface according to an embodiment of the disclosure.

Please refer to FIG. 9, which is a schematic diagram of a user interface according to an embodiment of the disclosure. In FIG. 9, the user interface 900 can be used for the user to select a preset trajectory for enabling the glove mode from a plurality of trajectories 911 to 914. As shown in FIG. 9, the trajectories 911 to 914 may correspond to, for example, specific movement directions or patterns, but the disclosure is not limited thereto.

Assuming that the user selects the trajectory 911 (that is, slide down) as the preset trajectory for enabling the glove mode, then when the user slides down a touch gesture that is long enough on the touch panel with a glove, the control circuit determines that the touch gesture meets the third preset condition. In addition, since the touch gesture is inputted with a glove, the first and second preset conditions are also met.

In brief, if the touch gesture detected by the touch panel meets all the first, second, and third preset conditions, it means that the user intends to activate the glove mode with a glove. Therefore, in Step S720, in response to that the touch gesture meets the above preset conditions, the control circuit decreases the touch detection threshold of the touch panel to switch the touch panel to the glove mode. In an embodiment, the control circuit may decrease the touch detection threshold from the preset detection threshold (for example, 100) to a second detection threshold (for example, 50).

Next, in Step S730, in response to that a second touch event occurs on the touch panel, the control circuit obtains a second sensing variation corresponding to the second touch event. Further, in Step S740, in response to determining that the sensing variation is larger than the touch detection threshold, the control circuit determines that the second touch event is a second touch operation and reports a second touch coordinate of the second touch operation.

In an embodiment, in response to determining that the second sensing variation is not larger than the touch detection threshold, the control circuit ignores the second touch event. Nevertheless, the disclosure is not limited thereto.

In some embodiments, after switching the touch panel from the general detection mode to the glove mode, the control circuit also determines whether a touch event is detected within a second preset time (for example, 3 seconds). If no touch event is detected within the second preset time, the control circuit restores the touch detection threshold to the preset detection threshold to switch the touch panel to the general detection mode. Nevertheless, the disclosure is not limited thereto.

It is known from the above that, after determining that no water is present on the touch panel, the method of the disclosure further determines whether the touch gesture meets a plurality of preset conditions so as to determine whether the user intends to activate the glove mode with a glove. Thereby, the user can activate the glove mode easily, and reporting of an erroneous touch coordinate caused by water can also be prevented. In addition, it has been experimentally confirmed that the glove mode of the disclosure also supports the user to input with two fingers when wearing gloves.

Furthermore, in an embodiment, a method of the disclosure may integrate the foregoing embodiments into a complete set of processes to automatically switch between the modes.

Figure 10:
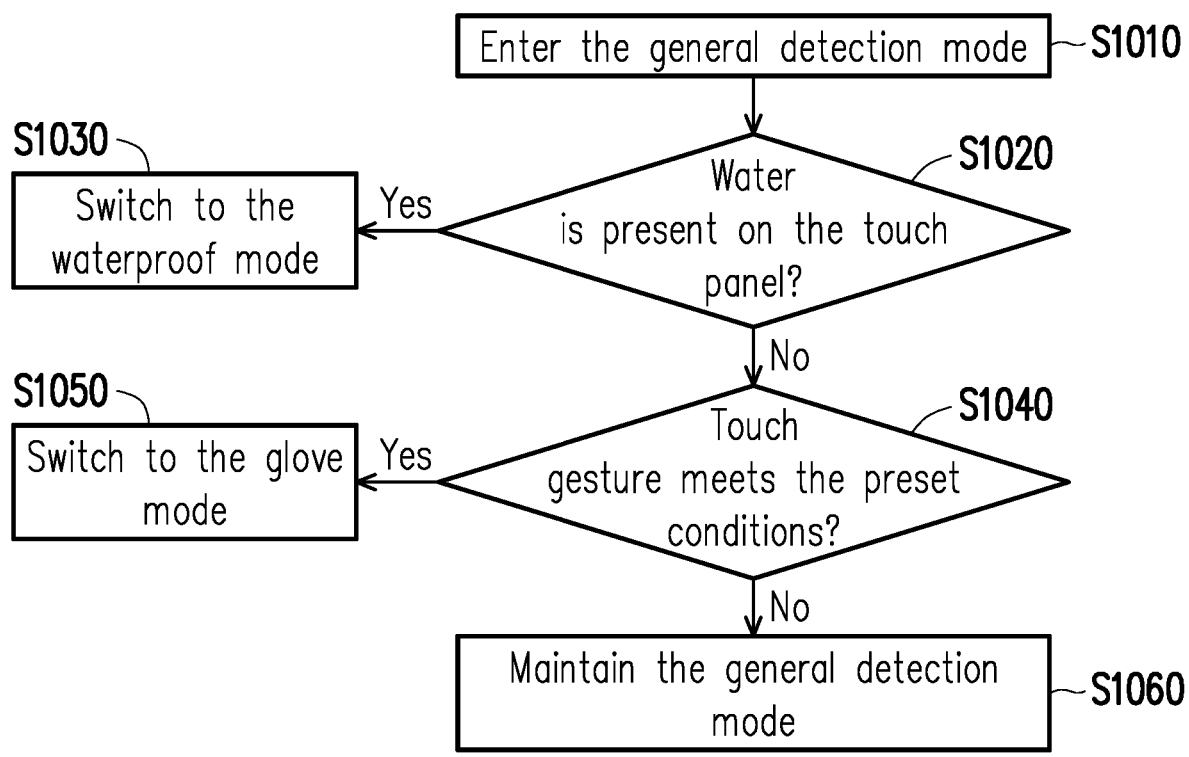
FIG. 10 shows a method of switching an operation mode of a touch panel according to an embodiment of the disclosure.

Please refer to FIG. 10, which shows a method of switching an operation mode of a touch panel according to an embodiment of the disclosure. First, after obtaining the reference value of each sensor, in Step S1010, the control circuit controls the touch panel to enter the general detection mode. That is, the control circuit takes the preset detection threshold as the touch detection threshold and takes the preset area threshold as the sensing area threshold.

Then, in Step S1020, the control circuit determines whether water is present on the touch panel. If the result is Yes, the control circuit moves on to Step S1030 to switch the touch panel to the waterproof mode, that is, increasing the touch detection threshold and the sensing area threshold of the touch panel, which allows the touch panel to maintain the function of correctly reporting the touch coordinate when water is present.

However, if no water is present on the touch panel, the control circuit moves on to Step S1040 to determine whether the touch gesture meets the preset conditions so as to determine whether the user intends to activate the glove mode with a glove.

If the touch gesture meets the preset conditions, the control circuit correspondingly performs Step S1050 to switch the touch panel to the glove mode, that is, decreasing the touch detection threshold of the touch panel. Thereby, the user can activate the glove mode easily, and reporting of an erroneous touch coordinate caused by water can also be prevented.

However, if the touch gesture does not meet the preset conditions, the control circuit performs Step S1050 to keep the touch panel operating in the general detection mode.

In addition, as mentioned in the previous embodiments, after the touch panel is switched to the waterproof mode, if no touch event is detected within the first preset time (for example, 1 second), the control circuit switches the touch panel from the waterproof mode back to the general detection mode. Similarly, after the touch panel is switched to the glove mode, if no touch event is detected within the second preset time (for example, 3 seconds), the control circuit switches the touch panel from the glove mode back to the general detection mode. Nevertheless, the disclosure is not limited thereto.

In conclusion, after determining that water is present on the touch panel, the method of the disclosure increases the touch detection threshold and the sensing area threshold correspondingly, so that the touch panel can maintain the function of correctly reporting the touch coordinate. Therefore, the user can operate the touch panel even when water is present on the touch panel.

In addition, after determining that no water is present on the touch panel, the method of the disclosure further determines whether the touch gesture meets a plurality of preset conditions so as to determine whether the user intends to activate the glove mode with a glove. Thereby, the user can activate the glove mode easily, and reporting of an erroneous touch coordinate caused by water can also be prevented. Moreover, the method of the disclosure may also switch the touch panel from the waterproof mode/glove mode to the general detection mode when required so as to realize a more intelligent mode switching mechanism.

Although the disclosure has been described above with reference to the foregoing embodiments, they are not intended to limit the disclosure. It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An operation mode switching method for switching an operation mode of a touch panel, the operation mode switching method comprising:
   determining whether water is present on the touch panel;
   in response to determining that the water is present on the touch panel, increasing a touch detection threshold of the touch panel and increasing a sensing area threshold of the touch panel to switch the touch panel to a waterproof mode;
   in the waterproof mode, in response to determining that a first touch event occurs on the touch panel, obtaining a first sensing variation and a first touch event area corresponding to the first touch event; and
   in response to determining that the first touch event area is larger than the sensing area threshold and the first sensing variation is larger than the touch detection threshold, determining that the first touch event is a first touch operation,
      wherein the touch panel comprises a plurality of sensors each having a sensing variation, and the sensors are arranged in a plurality of columns and a plurality of rows,
         wherein determining whether the water is present on the touch panel comprises:
            determining whether a specific column or a specific row is present on the touch panel, wherein the sensors in the specific column or the specific row are at least divided into a first group, a second group, and a third group, wherein the second group is between the first group and the third group, and the sensing variation of each of the sensors in the first group and the third group is smaller than a negative sensing threshold, and the sensing variation of each of the sensors in the second group is larger than a positive sensing threshold; and
            in response to determining that the specific column or the specific row is present, determining that the water is present on the touch panel.

2. The operation mode switching method according to claim 1, wherein increasing the touch detection threshold of the touch panel and increasing the sensing area threshold of the touch panel comprises:
   increasing the touch detection threshold from a preset detection threshold to a first detection threshold; and
   increasing the sensing area threshold from a preset area threshold to a first area threshold, wherein the touch panel determines a general detection mode according to the preset detection threshold and the preset area threshold.

3. The operation mode switching method according to claim 2, wherein after switching the touch panel to the waterproof mode, the operation mode switching method further comprises:
   in response to that the first touch event is not detected within a first preset time, restoring the touch detection threshold to the preset detection threshold and restoring the sensing area threshold to the preset area threshold to switch the touch panel to the general detection mode.

4. The operation mode switching method according to claim 1, wherein obtaining the first sensing variation and the first touch event area corresponding to the first touch event comprises:
   obtaining a plurality of specific sensors corresponding to the first touch event from the sensors;
   selecting a sensor from the specific sensors and taking a sensing variation of the sensor as the first sensing variation of the first touch event; and
   taking a total area occupied by the specific sensors as the first touch event area of the first touch event.

5. The operation mode switching method according to claim 4, further comprising:
   in an initialization stage of the touch panel, obtaining a capacitance of each of the sensors as a reference value of each of the sensors; and
   taking a difference between a sensing amount of each of the sensors and the reference value as the sensing variation of each of the sensors.

6. The operation mode switching method according to claim 1, wherein after determining that the first touch event is the first touch operation, the operation mode switching method further comprises:
   reporting a first touch coordinate of the first touch operation.

7. The operation mode switching method according to claim 1, further comprising:
   in response to determining that the first touch event area is not larger than the sensing area threshold or the first sensing variation is not larger than the touch detection threshold, ignoring the first touch event.

8. The operation mode switching method according to claim 1, wherein after determining that the water is not present on the touch panel, the operation mode switching method further comprises:
   in response to that a touch gesture is detected on the touch panel, determining whether the touch gesture meets a plurality of preset conditions; and in response to that the touch gesture meets the preset conditions, decreasing the touch detection threshold of the touch panel to switch the touch panel to a glove mode.

9. The operation mode switching method according to claim 8, wherein the preset conditions comprise a first preset condition, a second preset condition, and a third preset condition, the touch panel comprises a plurality of sensors, and determining whether the touch gesture meets the preset conditions comprises:

obtaining a plurality of touch points included in the touch gesture, wherein each of the touch points comprises a touch range and a plurality of sensing variations, wherein the sensing variations of each of the touch points are provided by the sensors within the touch range;

determining whether an area of the touch range of each of the touch points is larger than a specific area threshold and generating a first determination result corresponding to the first preset condition;

determining whether the sensing variations of each of the touch points are all smaller than a specific sensing variation threshold and generating a second determination result corresponding to the second preset condition, wherein the specific sensing variation threshold is smaller than the touch detection threshold;

determining whether a movement distance of a movement trajectory of the touch gesture is larger than a preset distance and whether the movement trajectory matches a preset trajectory and generating a third determination result corresponding to the third preset condition; and in response to that the first determination result indicates that the area of the touch range of each of the touch points is larger than the specific area threshold, the second determination result indicates that the sensing variations of each of touch points are all smaller than the specific sensing variation threshold, and the third determination result indicates that the movement distance of the movement trajectory of the touch gesture is larger than the preset distance and the movement trajectory matches the preset trajectory, determining that the touch gesture meets the preset conditions.

10. The operation mode switching method according to claim 8, wherein decreasing the touch detection threshold of the touch panel comprises:

decreasing the touch detection threshold from a preset detection threshold to a second detection threshold, wherein the preset detection threshold corresponds to the general detection mode of the touch panel.

11. The operation mode switching method according to claim 8, wherein after switching the touch panel to the glove mode, the operation mode switching method further comprises:

in response to that a second touch event occurs on the touch panel, obtaining a second sensing variation corresponding to the second touch event; and in response to determining that the second sensing variation is larger than the touch detection threshold, determining that the second touch event is a second touch operation and reporting a second touch coordinate of the second touch operation.

12. The operation mode switching method according to claim 11, wherein after switching the touch panel to the glove mode, the operation mode switching method further comprises:

in response to that the second touch event is not detected within a second preset time, restoring the touch detection threshold to a preset detection threshold to switch the touch panel to the general detection mode.

13. The operation mode switching method according to claim 11, further comprising:

in response to determining that the second sensing variation is not larger than the touch detection threshold, ignoring the second touch event.

\* \* \* \* \*